United States Patent
Sriram (10) Patent No.: US 9,092,816 B1
(45) Date of Patent: Jul. 28, 2015

(54) USE OF SOCIAL CONNECTIONS FOR ITEM EXPLORATION

(75) Inventor: Siddharth Sriram, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 595 days.

(21) Appl. No.: 13/314,935

(22) Filed: Dec. 8, 2011

(51) Int. Cl.
*G06Q 30/06* (2012.01)
*G06Q 50/00* (2012.01)

(52) U.S. Cl.
CPC .......... *G06Q 30/0631* (2013.01); *G06Q 50/01* (2013.01)

(58) Field of Classification Search
CPC .............. G06Q 30/00; G06Q 30/0601; G06Q 30/0631; G06Q 50/01; G06Q 30/0224; G06Q 30/0641; G06Q 30/0269
USPC ................................ 705/26.1, 27.1, 26.7, 319
See application file for complete search history.

(56) References Cited

U.S. PATENT DOCUMENTS

| | | | |
|---|---|---|---|
| 8,181,111 B1* | 5/2012 | Onyon et al. | 715/738 |
| 2010/0161400 A1* | 6/2010 | Snodgrass et al. | 705/14.16 |

OTHER PUBLICATIONS

What Your Facebook Interests Say About Your Holiday Wishlist (Neff, Jack. Crain Communications. Dec. 5, 2011).*

* cited by examiner

*Primary Examiner* — Courtney Stopp
(74) *Attorney, Agent, or Firm* — Thomas | Horstemeyer, LLP (57) ABSTRACT

Disclosed are various embodiments for identifying relevant browsing and/or purchasing activity associated with one or more contacts of a user having a user account with an electronic commerce system. In one embodiment, a determination is made as to whether each contact is associated with a different user account with the electronic commerce system. If so, network content comprising such relevant browsing and/or purchasing history may be presented to the user.

24 Claims, 5 Drawing Sheets

USE OF SOCIAL CONNECTIONS FOR ITEM EXPLORATION

BACKGROUND

A user may browse various items they wish to purchase via online commerce. Many times, friends of the user may have previously explored and/or researched such items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to obtaining relevant browsing and/or purchasing activity associated with one or more contacts of a user. In one embodiment, a user having a user account with an electronic commerce system may have developed one or more relationships with various contacts and/or friends through a social networking account. As such, the user's social networking account may be accessed in order to obtain information about each of the user's contacts and/or friends. In some cases, one or more contacts and/or friends may also have a user account with the electronic commerce system. To this end, the user may consult or view a relevant browsing history and/or purchasing history associated with such contacts relating to items being browsed by the user in order to make an informed purchasing decision. In the following discussion, a general description of the system and its components is provided, followed by a discussion of the operation of the same.

Figure 1:
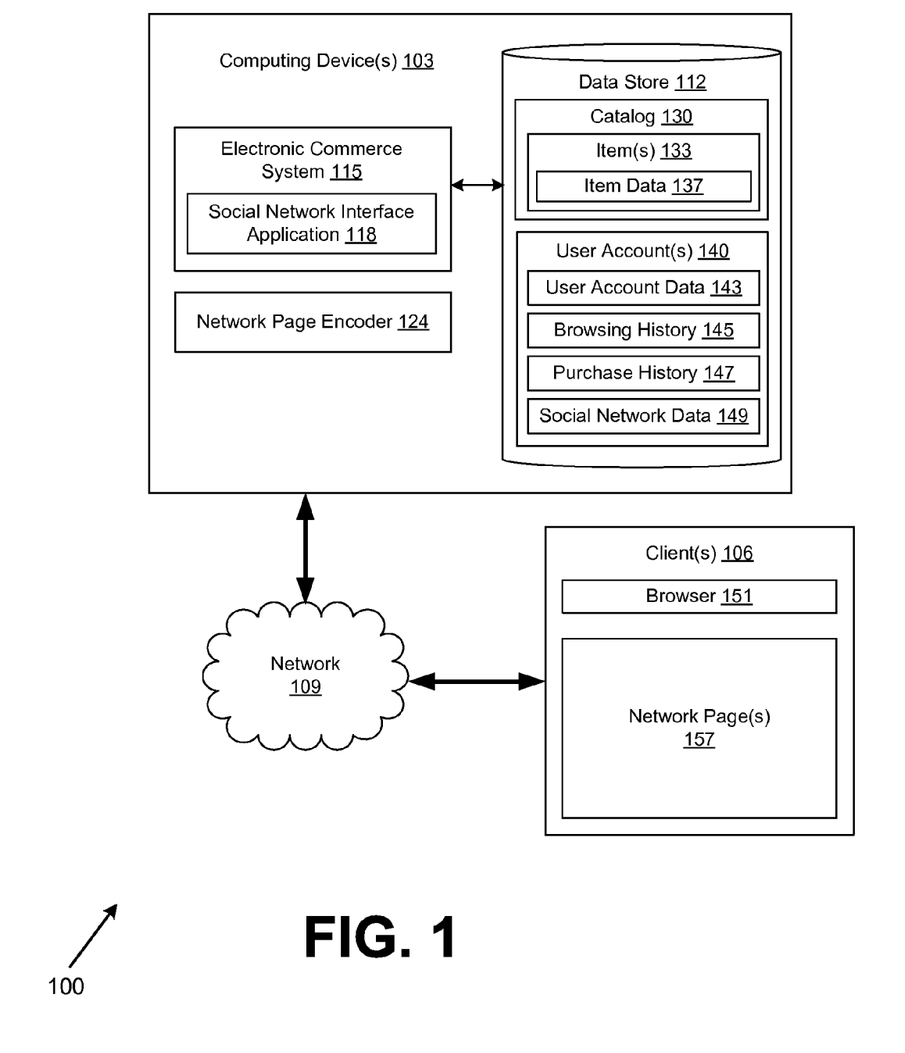
FIG. 1 is a drawing of a networked environment according to various embodiments of the present disclosure.

With reference to FIG. 1, shown is a networked environment 100 according to various embodiments. The networked environment 100 includes a computing device 103, clients 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 115 and other applications, services, processes, systems, engines, or functionality not discussed in detail herein. The electronic commerce system 115 may include various components such as, for instance, a social network interface application 118, a network page encoder 124, and other applications and/or processes as can be appreciated.

The electronic commerce system 115 is executed in order to facilitate the online purchase of items over the network 109. The electronic commerce system 115 also performs various back-end functions associated with the online presence of a merchant in order to facilitate the online purchase of items 133. For example, the electronic commerce system 115 may generate various network pages using the network page encoder 124, such as web pages, or other types of network content that are provided to clients 106 for the purposes of selecting items 133 for purchase, rental, download, lease, or any other forms of consumption as can be appreciated. Alternatively, a mobile application may be executed in a client 106 to generate and render user interfaces using data served up by the computing device 103 and/or other servers. To this end, when rendered, network pages 157 generate a user interface as can be appreciated.

The social network interface application 118 may be configured to access a user's social networking account registered through a social networking platform application, such as, for instance, Facebook®, Twitter®, LinkedIn®, Myspace®, and potentially other social networking platform applications. Further, the social query application 118 may obtain data about one or more contacts/friends of the user by gathering data from the user's social networking account and identify if such contacts/friends are associated with a different user account 140 through the electronic commerce system 115. If so, the social network interface application 118 may identify and present to the user relevant browsing and/or purchasing associated with each of the user's contacts/friends as will be described.

The data stored in the data store 112 includes, for example, a catalog 130 of items 133, user accounts 140, and potentially other data. Associated with each of the items 133 is item data 137, and potentially other data. The item data 137 may comprise information about each of the items 133, such as, for instance, item descriptions, item prices, item reviews, item images, and potentially other data.

Associated with each user account 140 are user account data 143, a browsing history 145, a purchase history 147, social network data 149, and potentially other data. The user account data 143 may comprise information about a particular user, such as, for example, name, address, payment instruments, billing information, account settings, passwords, and potentially other data.

The browsing history 145 may comprise information associated with a user's browsing activity, such as, for instance, a listing of the items 133 viewed by the user, an amount of time the user spent looking at one or more network pages 157 associated with one or more items 133 and potentially other data. The purchase history 147 may comprise information associated with a user's purchasing activity, such as, for instance, a listing of the items 133 the user has purchased and potentially other data.

Lastly, each user account 140 may comprise social network data 149. In one embodiment, the social network data 149 may comprise information about one or more friends or contacts of the user, such as, for instance, names, usernames, a description of networks, and potentially other data as will be described.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, or other devices with like capability.

The client 106 may be configured to execute various applications, such as, a browser 151, and/or other applications. The browser 151 may be executed in a client 106, for example, to access and render one or more network pages 157, such as web pages or other network content served up by the computing device 103 and/or other servers. Alternatively, a mobile application may be executed in a client 106 to generate and render user interfaces using data served up by the computing device 103 and/or other servers. To this end, when rendered, network pages 157 generate a user interface as can be appreciated.

Next, a general description of the operation of the various components of the networked environment 100 is provided. As briefly discussed above, one or more users having a user account 140 through the electronic commerce system 115 may also have one or more social networking accounts. That is, a user may have created a social networking account by registering with a social networking platform application, such as, for instance, Facebook®, Twitter®, LinkedIn®, Myspace®, and the like. In some cases, the user may have established a number of relationships with various friends or contacts on the same networking platform. As such, the social networking account may comprise information about various friends or contacts of the user. For instance, a user having a Facebook® account may have hundreds of friends by submitting friend requests to other users having a Facebook® account.

To this end, a user may wish to link their user account 140 to their social networking account. To do so, a user may submit a request to the electronic commerce system 115 through network 109. In one embodiment, the user may provide security information in the request that may be used in order to access their social networking account, such as, for instance, a username, passwords, and so on. In another embodiment, such security information may have been previously provided and stored in association with a user's user account 140.

Upon receiving the request, the electronic commerce system 115 may execute the social network interface application 118. In one embodiment, the social network interface application 118 may be configured to access a user's social networking account by providing the user's security information to the social networking platform application operating the social networking account.

After successfully accessing a user's social networking account, the social network interface application 118 may then identify information associated with each social networking relationship with the user, such as friends of the user. For instance, a user's social networking account may comprise information about each friend of the user, such as, for instance, a username, a first and last name, one or more networks, a place they are living, and the like. As such, the social network interface application 118 may extract such information for each of the user's friends. In another embodiment, the social network interface application 118 may identify information associated each friend of the user by searching the user's social networking activity, such as, for example, identifying each instance the user submitted a friend request that was accepted by another user on the platform.

Thereafter, the social network interface application 118 may determine whether any of the user's friends or contacts are associated with other user accounts 140 in the electronic commerce system 115. To do so, the social network interface application 118 may use various techniques. In one embodiment, the social network interface application 118 may generate keywords from the information associated with each friend obtained from the user's social networking account. Thereafter, the social networking application 118 may execute a search of one or more different user accounts 140 in order to identify one or more associations between the keywords and user account data 143.

For instance, suppose the social network interface application 118 has identified that one friend of the user is associated with the name, John Smith, lives in Seattle, Wash., and belongs to the network entitled "I love photography!" To this end, the social network interface application 118 may search user account data 143, a browsing history 145 and/or purchasing history 147 in order to determine a different user account 140 that is associated with a user having a name of John Smith, in Seattle and/or a purchase history 147 of various items 133 related to photography.

In another embodiment, the social network interface application 118 may determine if each friend or contact is associated with a user account 140 by identifying a friend's social networking account. That is, the social networking application 118 may search different user accounts 140 of the electronic commerce system 115 in order to identify a particular user account 140 that links to the same social networking account of the user's friend.

For instance, suppose the social network interface application 118 has accessed a user's social networking that is associated with a second social networking account. Further assume that the second social networking account is associated with a Sarah Brown that lives in Seattle, Wash. As such, the social network interface application 118 may have searched various user accounts 140 and identified six user accounts 140 associated with the name Sarah Brown living in Seattle. To this end, the social network interface application 118 may access each of the six user accounts 140 in order to identify a particular user account 140 that is linked to the same social networking account associated with the user's friend named Sarah Brown.

After identifying one or more friends of the user having a user account 140, the social network interface application 118 may store a listing of each of the friend's user accounts 140 in social network data 149. For those users who have also linked to their social networking account on the same platform of the user, the social network interface application 118 may facilitate the user consulting a browsing and/or purchasing activity for each friend.

In one embodiment, the browsing and/or purchasing activity for each friend may comprise, for example, a listing and/or description of one or more items 133 being browsed and/or purchased by the friend, a time and/or date the friend spent viewing each item 133, and potentially other information. Additionally, the browsing and/or purchasing activity for each friend may comprise, a listing of one or more items 133 associated with a review submitted by the friend, added to the friend's wish list, added to the friend's shopping cart, and the like.

For instance, in some cases, a user may want to purchase an item 133 within an item category, but may not know much about the item category. For instance, a user may wish to purchase a digital camera within the electronics category, but doesn't know which digital camera within that category is easy to use, reasonably priced, and so on. As such, the user may generate a request to view a friend's history of browsing and/or purchasing items 133 that relate to a digital camera.

To do so, a user may select a control in order to generate a request to view a friend's relevant browsing and/or purchasing activity. That is, a user may be viewing one or more network pages 157 generated by the electronic commerce system 115 comprising information about various digital cameras. If the user is unfamiliar with digital cameras, then the user may select a control or button in order to generate the request to the relevant browsing and/or purchasing history relating to digital cameras for other users having a social networking relationship with the user, such as, friends of the user. Additionally, in one embodiment, the user may select a range of temporal values in order to view only the browsing and/or purchasing activity occurring within a predefined period of time.

In another embodiment, the social network interface application 118 may be configured to automatically generate a request to view friends' browsing and/or purchasing activity if the user is browsing various items 133. That is, the social network interface application 118 may be configured to detect that the user is browsing based upon, for instance, the user hovering a mouse around one or more items 133 related to a particular category and/or repeatedly viewing various items 133 associated with one category.

In response to such request, the social network interface application 118 may identify whether one or more friends of the user has browsed and/or purchased items 133 associated with the user's browsing activity. To do so, in one embodiment, the social network interface application 118 may generate one or more keywords associated with the items 133 the user is browsing. The keywords may be based upon, for instance, a user's search query, a description of the items 133 or a category associated with the user's browsing activity.

To this end, the social network interface application 118 may then use such keywords to execute a search of each friend's browsing history 145 and/or the purchase history 147. For instance, in the example above, the social network interface application 118 may have generated the keywords "digital camera" and searched each friend's user account 140 in order to identify all browsing and/or purchasing histories associated with digital cameras.

Upon identifying all relevant browsing and/or purchase activity, the social network interface application 118 may generate one or more network pages 157 comprising the relevant browsing and/or purchasing activity for rendering for display on a client 106 of the user. For each friend, the network page 157 may comprise a browsing history 145, a purchase history 147, the time the friend spent browsing, whether the friend's browsing activity resulted in a purchase, and potentially other information.

In one embodiment, the user or one or more of the user's friends may not wish to share their browsing and/or purchasing history with others. To this end, the user and/or friends of the user may select a control in order to identify whether a browsing and/or purchasing history is private or public to other users.

In another embodiment, the social network interface application 118 may first analyze and/or rank the relevant browsing and/or purchasing activities and then generate one or more network pages 157 based upon such rankings. For instance, the social network interface application 118 may rank the relevant browsing and/or purchasing activity based upon, characteristics of the items 133 browsed and/or purchased, such as item prices, item reviews, items 133 that are new, and the like.

As another non-limiting example, the social network interface application 118 may rank the relevant browsing and purchasing activity based upon, for instance, how long a friend spent browsing, whether the relevant browsing history appears to be deliberate, and the like. For instance, assume that a first user browsed similar items 133 for two hours and fifty minuets and a second user browsed similar items 133 for five minutes in one day. In this example, the social networking application 118 may only display the browsing activity of the first user.

In another non-limiting example, the social network interface application 118 may rank the relevant browsing and/or purchasing activity based upon similarity between the user and each of the user's friends in background, interests, and the like. For instance, if the user is a computer analyst, then social networking application 118 may rank and display the relevant browsing and/or purchasing activity associated with friend's that work with computers.

In another embodiment, the social network interface application 118 may identify a listing of items 133 included in the relevant browsing and/or purchasing activities and select one or more items 133 to recommend to the user. For instance, suppose the relevant browsing and/or purchasing history of other user accounts 140 includes ten different items 133. To this end, the social network interface application 118 may generate recommendations for one or more items 133 based upon a variety of factors, such as, for instance, the similarity in background, interests between the user and each of the user's friends.

In still other embodiments, the social network interface application 118 may generate one or more network pages 157 comprising the relevant browsing and/or purchasing that is associated with one or more factors identified by the user. For instance, a user may identify that they only wish to view the relevant browsing history that resulted in a purchase, exceeded two hours, and the like. To this end, the social network interface application 118 may display to the user only the relevant browsing and/or purchasing activity meeting the user's objective.

Additionally, in one embodiment, the one or more network pages 157 may comprise contact information for each friend associated with a relevant browsing and/or purchasing activity. That is, the social network interface application 118 may identify an email address, a phone number, and potentially other contact information that the user may use in order to contact one or more friends. To this end, the user may contact and ask specific questions about the item 133 that one or more of their friends have browsed or purchased.

In another embodiment, the user may use a messaging system in order to ask a friend about one or more items 133 browsed and/or purchased by the friend. To do so, the user may select a control to in order to generate a message to the friend, such as, for instance, an email, a text message, an instant message, a telephone message, and so on. The message may then be transmitted to the friend, either synchronously or asynchronously. For instance, the browsing and/or purchasing activity of a friend may indicate the friend purchased a book to read on an electronic reading device. To this end, the user may generate and transmit an email message to the friend inquiring if the user may borrow the book.

Figure 2:
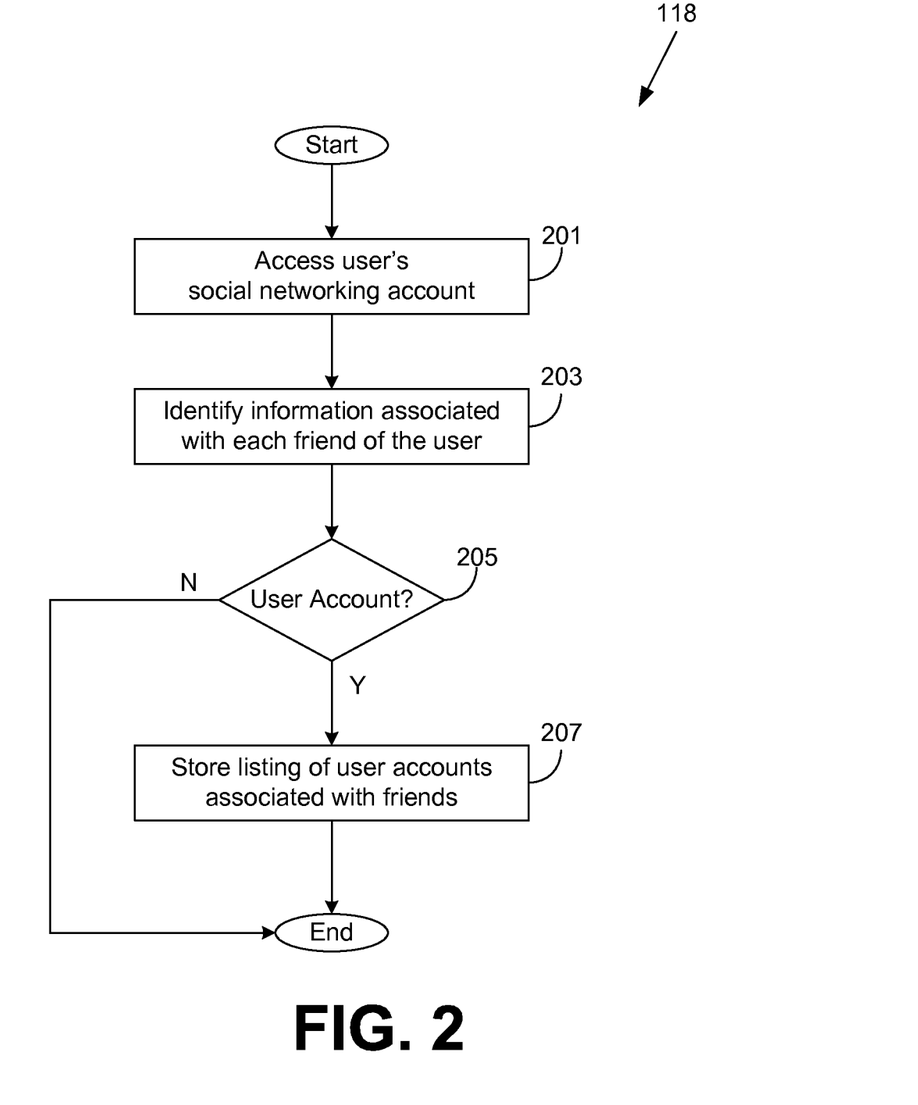
FIG. 2 is a flowchart illustrating one example of functionality implemented as portions of a social network interface application executed in a computing device in the networked environment of FIG. 1 according to various embodiments of the present disclosure.

Referring next to FIG. 2, shown is a flowchart that provides one example of the operation of a portion of the social network interface application 118 according to various embodiments. It is understood that the flowchart of FIG. 2 provides merely an example of the many different types of functional arrangements that may be employed to implement the operation of the portion of the social network interface application 118 as described herein. As an alternative, the flowchart of FIG. 2 may be viewed as depicting an example of steps of a method implemented in the computing device 103 (FIG. 1) according to one or more embodiments.

Beginning with box 201, in response to a request from a user to link their user account 140 (FIG. 1) to their social networking account, the social network interface application 118 may access the user's social networking account. As described above, a user may provide security information such as, usernames, passwords, etc. to the social network interface application 118 in order to access their social networking account, such as usernames, passwords, and the like. Thereafter, in box 203, the social network interface application 118 may extract information about each friend or contact of the user, such as a name, an address, a description of interests, and so on.

Next, in box 205, the social network interface application 118 determines if one or more friends of the user is associated with a user account 140. To do so, the social network interface application 118 may compare the information associated with each of the user's friends data stored in association with each user account. Alternatively, the social network interface application 118 may find user accounts 140 of users that have given access to the same social network page as the user's friend. If none of the friends of the user are associated with a user account, then the social networking application 118 ends as shown. If, however, one or more friends are associated with a user account 140, then in box 207, the social network interface application 118 stores a listing of each of the friend's user accounts 140. Thereafter, the social network interface application 118 ends as shown.

Figure 3:
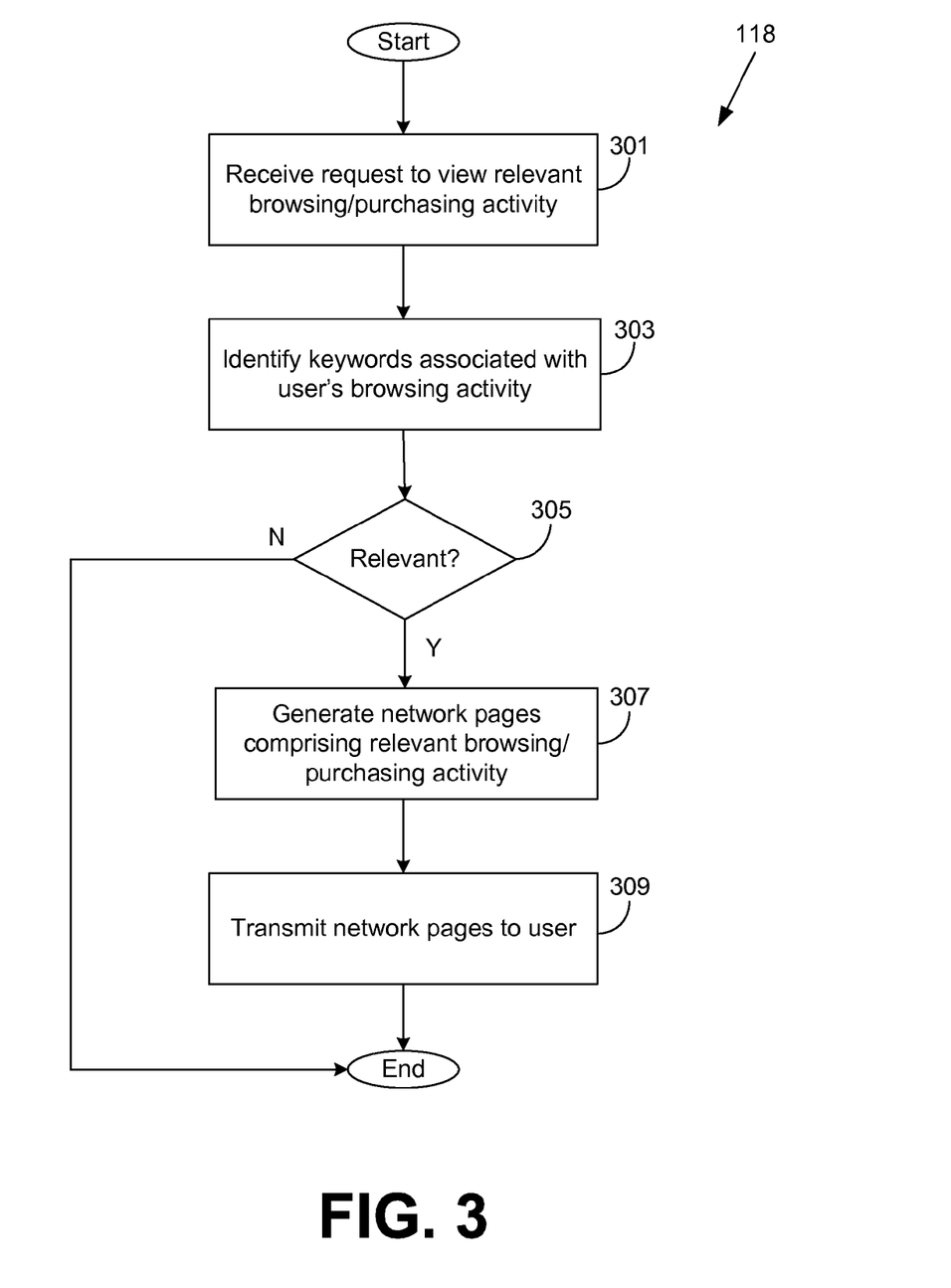
FIG. 3 is a flowchart illustrating another example of functionality implemented as portions of the social network interface application executed in a computing device in the networked environment of FIG. 1 according to various embodiments of the present disclosure.

Referring next to FIG. 3, shown is a flowchart that provides another example of the operation of a portion of the social network interface application 118 according to various embodiments. It is understood that the flowchart of FIG. 3 provides merely an example of the many different types of functional arrangements that may be employed to implement the operation of the portion of the social network interface application 118 as described herein. As an alternative, the flowchart of FIG. 3 may be viewed as depicting an example of steps of a method implemented in the computing device 103 (FIG. 1) according to one or more embodiments.

Beginning with box 301, the social network interface application 118 receives a request from the user to view the relevant browsing and/or purchasing activity of one or more friends. Thereafter, in box 303, the social network interface application 118 identifies one or more keywords associated with the browsing activity of the user.

Thereafter, in box 305, the social network interface application 118 determines if one or more friends of the user has generated a browsing history 145 (FIG. 1) and/or purchase history 147 (FIG. 1) relating to one or more keywords associated with the browsing activity of the user. If none of the user's friends have browsed and/or purchased one or more items 133 (FIG. 1) associated with the user's browsing activity, then the social network interface application 118 ends as shown. If, however, one or more friends have browsed and/or purchased one or more items 133 associated with the user's browsing activity, then the social network interface application 118 proceeds to box 307.

In box 307, the social network interface application 118 then generates one or more network pages 157 (FIG. 1) or other network content that presents the relevant browsing and/or purchasing activity of the user's friends. Lastly, in box 309, the social network interface application 118 then transmits the network page 157 to the user. Thereafter, the social networking application 118 ends as shown.

Figure 4:
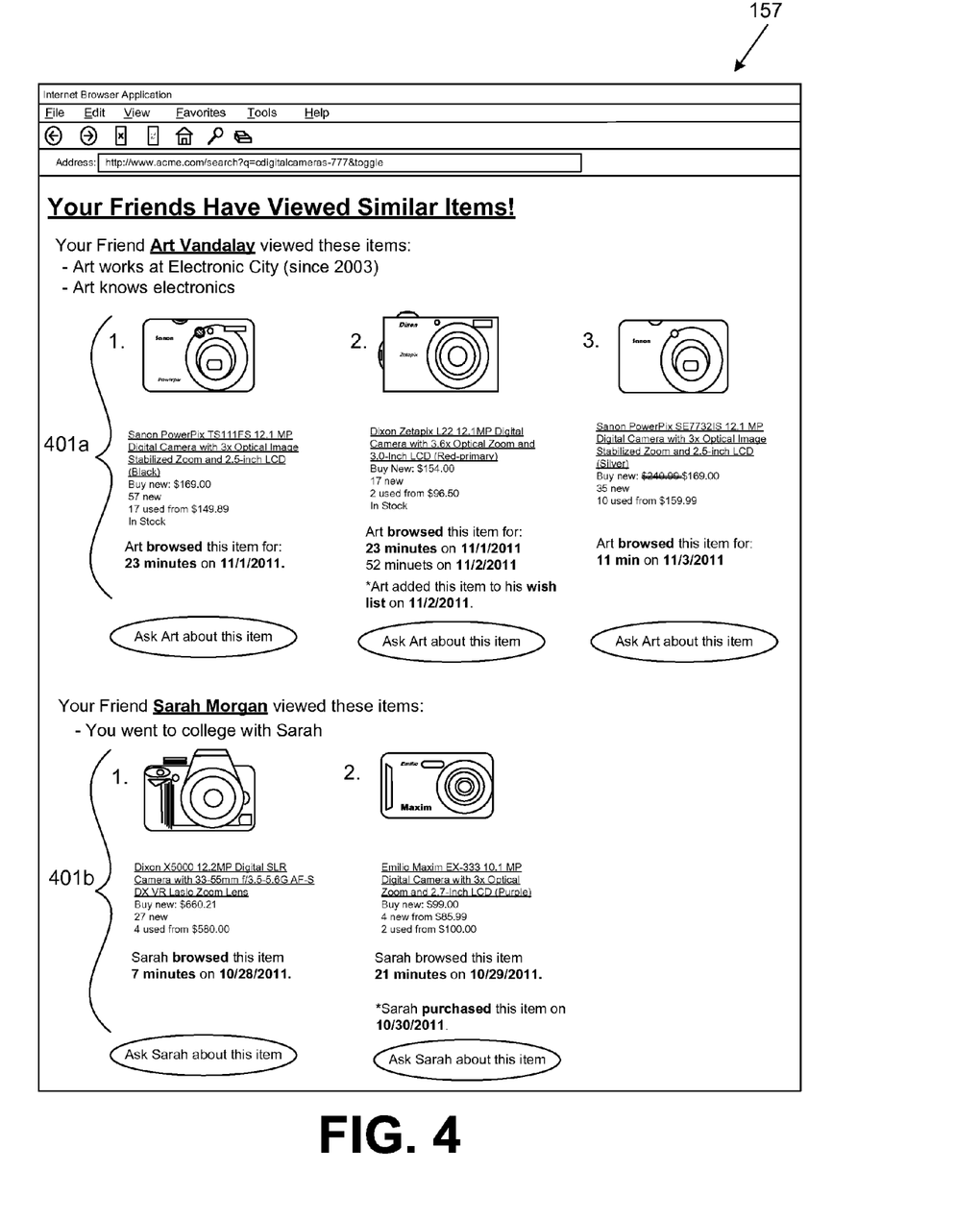
FIG. 4 is a drawing of an example of a user interface rendered by a client in the networked environment of FIG. 1 according to various embodiments of the present disclosure.

Turning now to FIG. 4, shown is a drawing of an example of a user interface rendered by a client in the networked environment of FIG. 1 according to various embodiments of the present disclosure.

As illustrated in FIG. 4, the network page 157 may comprise a relevant browsing history and/or purchasing history 401a, 401b associated with two friends of the user, namely Art and Sarah. For each friend, the browsing and/or purchasing history may comprise an image of the item 133 viewed and/or purchased by the friend, a description of the item 133, and a time and date the friend viewed and/or purchased the item 133. That is, the relevant browsing and/or purchasing history 401a of Art indicates that Art browsed a Sanon digital camera on November $2^{nd}$ for 23 minutes, a Dixon digital camera for 23 minutes and 52 minutes on November $1^{st}$ and $2^{nd}$ respectively, and another Sanon digital camera for 11 minutes on November $3^{rd}$.

Additionally, for each item 133, the relevant browsing and/or purchasing history for each friend may also include a description of other actions taken by the friend, such as, for instance, if the friend purchased the item 133, added the item to a wish list or shopping cart, submitted a review of the item 133, and potentially other actions. That is, the relevant browsing and/or purchasing history 401a of Art indicates that Art added the Dixon digital camera to his wish list on November $2^{nd}$. Similarly, the relevant browsing and/or purchasing history 401b of Sarah indicates Sarah purchased an Emilio digital camera on October $30^{th}$.

Further, for each item 133 associated with a friends' browsing and/or purchase history 401 a control is provided that the user may select in order to facilitate a communication with the friend. For instance, the control may be selected in order to generate a message to the friend such as, for example, an email, a text message, an instant message, and the like. The user may then transmit the message to the friend either synchronously or asynchronously.

For instance, the user may wish to ask Sarah why she purchased the Emilio camera. To do so, in one embodiment, the user may select the "Ask Sarah about this Item" button in order to be directed to another network page 157 showing one or more methods that may be used to contact Sarah, such as, an email address, a phone number, and so on. Additionally, in one embodiment, if the friend is logged into their social networking account and/or user account, the user may select the "Ask Sarah about this item" button in order to synchronously communicate with the friend via, for instance, instant message.

Figure 5:
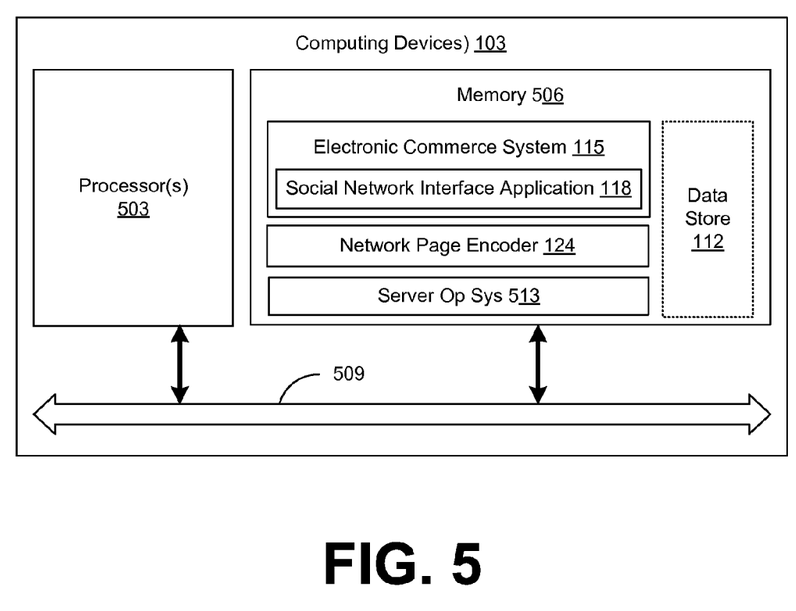
FIG. 5 is a schematic block diagram that provides one example illustration of a computing device employed in the networked environment f FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several other components that are executable by the processor 503. In particular, stored in the memory 506 and executed by the processor 503 are an electronic commerce system 115, a social network interface application 118, a network page encoder 124, a server op system 513, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 115, the social network interface application 118, the network page encoder 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates or other components, etc. Such technologies are generally well known by those skilled in the art and, consequently, are not described in detail herein.

The flowcharts of FIG. 2 or 3 show the functionality and operation of an implementation of portions of the social network interface application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIG. 2 or 3 show a specific order of execution, it is understood that the order of execution may differ from that which is depicted. For example, the order of execution of two or more blocks may be scrambled relative to the order shown. Also, two or more blocks shown in succession in FIG. 2 or 3 may be executed concurrently or with partial concurrence. Further, in some embodiments, one or more of the blocks shown in FIG. 2 or 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115, the social network interface application 118, or the network page encoder 124, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising instructions that, when executed, causes the computing device to at least:
   link a user account of a user of an electronic commerce system to a social networking account of the user in response to a request received from the user made via a social networking application associated with the social networking account;
   identify a plurality of contacts associated with the social networking account of the user;
   verify that each contact of the plurality of contacts is associated with a different user account of the electronic commerce system;
   generate at least one keyword associated with an item the user is browsing in the electronic commerce system;
   identify a relevant browsing activity in the electronic commerce system associated with each contact of the plurality of contacts based at least in part on the at least one keyword;
   identify a relevant purchasing activity in the electronic commerce system associated with each contact of the plurality of contacts based at least in part on the at least one keyword;
   rank the relevant browsing activity and the relevant purchasing activity associated with each contact of the plurality of contacts;
   generate at least one item recommendation for the user based at least upon the relevant browsing activity associated with each contact of the plurality of contacts and the relevant purchasing activity associated with each contact of the plurality of contacts;
   generate at least one network page comprising the ranked relevant browsing activity associated with each contact of the plurality of contacts, the ranked relevant purchasing activity associated with each contact of the plurality of contacts, and the at least one item recommendation; and
   transmit code for generating the at least one network page to a computing device associated with the user.

2. The non-transitory computer-readable medium of claim 1, wherein identifying the plurality of contacts associated with the social networking account of the user further comprises verifying that each contact of the plurality of contacts has a social networking relationship with the user.

3. The non-transitory computer-readable medium of claim 1, wherein the ranking of the relevant browsing activity and the relevant purchasing activity associated with each contact of the plurality of contacts is based at least in part on a characteristic of the item the user is browsing in the electronic commerce system.

4. A system comprising:
   an electronic data store comprising browsing history data;
   at least one computing device including a processor comprising hardware in communication with the electronic data store; and
   a social network interface application executable in the at least one computing device, to at least:
      identify a plurality of contacts associated with a social networking account of a user of an electronic commerce system in response to a request from another computing device associated with the user, the user having a user account with the electronic commerce system;
      determine whether each contact of the plurality of contacts is associated with a different user account of the electronic commerce system;
      generate at least one keyword associated with an item the user is browsing in the electronic commerce system;
      identify a relevant browsing activity in the electronic commerce system associated with each contact of the plurality of contacts from the browsing history data based at least in part on the at least one keyword;
      generate network content presenting the relevant browsing activity; and
      transmit the network content to the other computing device.

5. The system of claim 4, wherein the social networking account further comprises an account created by the user using a social networking application.

6. The system of claim 4, wherein identifying the plurality of contacts associated with the social networking account of the user further comprises verifying that each contact of the plurality of contacts has a social networking relationship with the user.

7. The system of claim 4, wherein the relevant browsing activity associated with each contact of the plurality of contacts comprises a visit to at least one item listing and at least one temporal value associated with a time at least one contact of the plurality of contacts spent during the visit to the at least one item listing.

8. The system of claim 7, wherein the at least one item listing further comprises a description associated with at least one item.

9. The system of claim 4, wherein identifying the relevant browsing activity associated with each contact of the plurality of contacts is based at least upon a ranking assigned to each contact of the plurality of contacts.

10. The system of claim 9, wherein the ranking is based at least in part on information associated with at least one item included within the relevant browsing activity associated with each contact of the plurality of contacts.

11. The system of claim 9, wherein the ranking is based at least in part on information associated with each contact of the plurality of contacts associated with the relevant browsing activity associated with each contact of the plurality of contacts.

12. The system of claim 4, wherein the social network interface application is further executable to at least generate at least one item recommendation based at least in part on the relevant browsing activity associated with each contact of the plurality of contacts.

13. The system of claim 4, wherein the relevant browsing activity associated with each contact of the plurality of contacts further comprises a relevant purchasing history associated with each contact of the plurality of contacts.

14. The system of claim 4, wherein the request is based at least in part on a user input, comprising a range of temporal values.

15. The system of claim 4, wherein the social network interface application is further executable to at least:
generate an electronic message in response to a user input relating to the relevant browsing activity associated with each contact of the plurality of contacts, the electronic message being used to facilitate a communication between a respective contact of the plurality of contacts and the user; and
transmit the electronic message to the respective contact of the plurality of contacts.

16. The system of claim 15, wherein the electronic message comprises at least one of an email message, a synchronous message, an asynchronous message, or a telephone message.

17. The system of claim 15, wherein the user input inquires whether the user may borrow at least one item purchased by the respective contact of the plurality of contacts.

18. The system of claim 9, wherein the ranking is based at least in part on a characteristic of the item the user is browsing in the electronic commerce system.

19. A computer-implemented method comprising:
identifying, by at least one computing device executing a social network interface application, a plurality of contacts associated with a social networking account of a user of an electronic commerce system having a user account in response to a request received from another computing device associated with the user, the at least one computing device comprising at least one hardware processor and being in data communication with an electronic data store comprising purchasing history data;
determining, in the at least one computing device, whether each contact of the plurality of contacts is associated with a different user account of the electronic commerce system;
generating, in the at least one computing device, at least one keyword associated with an item the user is browsing in the electronic commerce system;
identifying, in the at least one computing device, a relevant purchasing activity in the electronic commerce system associated with each contact of the plurality of contacts from the purchasing history data based at least in part on the at least one keyword;
generating, in the at least one computing device, network content comprising the relevant purchasing activity associated with each contact of the plurality of contacts; and
causing transmission of the network content to the other computing device over a network.

20. The computer-implemented method of claim 19, wherein each contact of the plurality of contacts is a social networking friend of the user.

21. The computer-implemented method of claim 19, wherein the relevant purchasing activity associated with each contact of the plurality of contacts is associated with an item category of interest to the user.

22. The computer-implemented method of claim 19, further comprising:
identifying, in the at least one computing device, at least one item recommendation based at least upon the relevant purchasing activity associated with each contact of the plurality of contacts;
generating, in the at least one computing device, different network content comprising the at least one item recommendation; and
transmitting, in the at least one computing device, the different network content to the user.

23. The computer-implemented method of claim 19, wherein the relevant purchasing activity associated with each contact of the plurality of contacts comprises at least one item listing associated with an item purchased by each contact of the plurality of contacts.

24. The computer-implemented method of claim 19, wherein the relevant purchasing activity associated with each contact of the plurality of contacts comprises at least one item listing associated with an item browsed by each contact of the plurality of contacts.

* * * * *